United States Patent
Danilo

(10) Patent No.: US 10,186,052 B1
(45) Date of Patent: Jan. 22, 2019

(54) TWO-PASS DECODING OF IMAGES

(71) Applicant: Google LLC, Mountain View, CA (US)

(72) Inventor: Alex Danilo, Freshwater (AU)

(73) Assignee: GOOGLE LLC, Moutain View, CA (US)

( * ) Notice: Subject to any disclaimer, the term of this patent is extended or adjusted under 35 U.S.C. 154(b) by 0 days.

(21) Appl. No.: 15/875,738

(22) Filed: Jan. 19, 2018

(51) Int. Cl.
*G06T 9/00* (2006.01)
*G09G 5/02* (2006.01)
*G06T 1/20* (2006.01)

(52) U.S. Cl.
CPC .......... *G06T 9/00* (2013.01); *G06T 1/20* (2013.01); *G09G 5/02* (2013.01); *G09G 2330/023* (2013.01); *G09G 2340/02* (2013.01); *G09G 2340/06* (2013.01)

(58) Field of Classification Search
None
See application file for complete search history.

(56) References Cited

U.S. PATENT DOCUMENTS 9,326,000 B2   4/2016   Zhao et al.
2017/0171554 A1   6/2017   Sarett et al.

OTHER PUBLICATIONS

Altera: "JPEG decoder example design", downloaded Oct. 8, 2017, 20 pages.

*Primary Examiner* — Michelle Chin
(74) *Attorney, Agent, or Firm* — Brake Hughes Bellermann LLP

(57) ABSTRACT

An image decoder includes a processor and a memory. The memory includes instructions configured to cause the processor to perform operations. The operations receive an encoded image, perform a first decoding of the encoded image to generate a first decoded image, store the first decoded image in the memory, process the first decoded image for displaying, perform a second decoding of the first decoded image and generate a second decoded image, and process the second decoded image for displaying.

20 Claims, 5 Drawing Sheets

TWO-PASS DECODING OF IMAGES

FIELD

This application relates, generally, to decoding images.

BACKGROUND

During the loading of a web page containing images, the decoding of the images takes time and consumes a significant amount of processing resources. For example, when a browser is loading images, the browser may block on image loading while waiting for the decoding of the images to finish. This may result in slower loading times. Several mechanisms are available to speed up the decoding process. However, such mechanisms may result in large white areas in the display area of a browser or may cause flicker during painting in the browser. This negatively affects user experience.

SUMMARY

In one aspect, an image decoder includes a processor and a memory. The memory includes instructions configured to cause the processor to perform operations. The operations include to receive an encoded image at a device, the encoded image being a baseline encoded image including a plurality of encoded blocks, perform at the device a first decoding of the encoded image, the first decoding generating a first decoded image and associated direct current (DC) and alternating current (AC) coefficients, the DC and AC coefficients generated for each encoded block of the plurality of encoded blocks, and the first decoded image decoded based on the DC coefficients, store the first decoded image and the associated DC and AC coefficients in a memory at the device, process by an application on the device, the first decoded image for displaying using the application, perform at the device a second decoding of the first decoded image and generating a second decoded image, the second decoding based on the DC and AC coefficients that are stored in the memory, the second decoding being performed when a condition is satisfied, and while the processing of at least a portion of the first decoded image is in progress, and process by the application at the device the second decoded image for displaying by the application.

In another aspect, a method includes receiving an encoded image at a device, the encoded image being a baseline encoded image including a plurality of encoded blocks, performing at the device a first decoding of the encoded image, the first decoding generating a first decoded image and associated direct current (DC) and alternating current (AC) coefficients, the DC and AC coefficients generated for each encoded block of the plurality of encoded blocks, and the first decoded image decoded based on the DC coefficients, storing the first decoded image and the associated DC and AC coefficients in a memory at the device, processing, by an application on the device, the first decoded image for displaying using the application, performing, at the device, a second decoding of the first decoded image and generating a second decoded image, the second decoding based on the DC and AC coefficients that are stored in the memory, the second decoding being performed when a condition is satisfied, and while the processing of at least a portion of the first decoded image is in progress, and processing, by the application at the device, the second decoded image for displaying by the application.

In a further additional aspect, a non-transitory computer-readable storage medium having stored thereon computer executable program code which, when executed on a computer system, causes the computer system to perform operations. The operations include receiving an encoded image at a device, the encoded image being a baseline encoded image including a plurality of encoded blocks, performing, at the device, a first decoding of the encoded image, the first decoding generating a first decoded image and associated direct current (DC) and alternating current (AC) coefficients, the DC and AC coefficients generated for each encoded block of the plurality of encoded blocks, and the first decoded image decoded based on the DC coefficients, storing the first decoded image and the associated DC and AC coefficients in a memory at the device, processing, by an application on the device, the first decoded image for displaying using the application, performing, at the device, a second decoding of the first decoded image and generating a second decoded image, the second decoding based on the DC and AC coefficients that are stored in the memory, the second decoding being performed when a condition is satisfied, and while the processing of at least a portion of the first decoded image is in progress, and processing, by the application at the device, the second decoded image for displaying by the application.

In one more aspect, a method includes receiving an encoded image at a device, the encoded image being a baseline encoded image including a plurality of encoded blocks, performing, at the device, a first decoding of the encoded image, the first decoding generating a first decoded image and associated direct current (DC) and alternating current (AC) coefficients, the DC and AC coefficients generated for each encoded block of the plurality of encoded blocks, and the first decoded image decoded based on the DC coefficients, storing the first decoded image and the generated DC and AC coefficients in a memory at the device, processing, by an application on the device, the first decoded image for displaying using the application, determining whether a condition for performing a second decoding is satisfied, and skipping the second decoding in response to the determining that the condition is not satisfied.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

Figure 1:
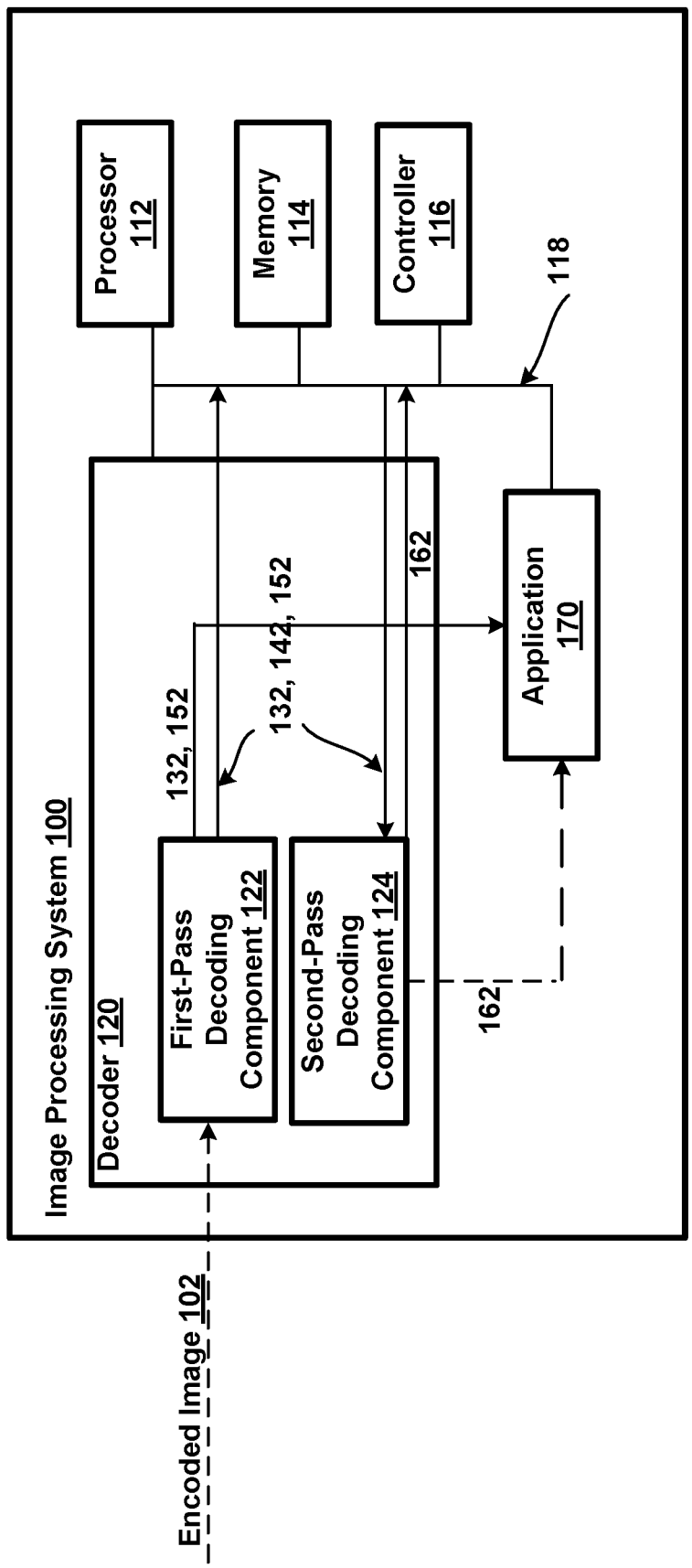
FIG. 1 illustrates a block diagram of an image processing system according to at least one example implementation.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

An example two-pass decoding mechanism is described herein. In one implementation, a decoder may receive an encoded image (e.g., a plurality of encoded blocks or an encoded bit stream) and may perform a two-pass decoding (e.g., a first decoding and a second decoding) of the image for fully decoding the encoded image.

A first decoding of the image (e.g., encoded image) may be performed using only direct current (DC) coefficients of the encoded blocks. The first decoding may generate a first decoded image which may be stored (e.g. temporarily) in a memory to be used later by the second decoding. The use of only the DC coefficients considerably reduces the amount of time and resources required for the first decoding as the inverse discrete cosine transform (IDCT) calculations using alternating current (AC) coefficients during a typical Joint Photographic Experts Group (JPEG) decoding process may consume majority of the decoding time (e.g., 80% of the computation time). The DC coefficients (e.g., one DC coefficient per block) and the AC coefficients (e.g., 63 AC coefficients per block) may be generated during the dequantization of the encoded image, and may be stored (temporarily) in the memory to be used during the second decoding.

The image generated by the first decoding is of low-resolution (e.g., low quality) as only the DC coefficients are used for decoding. In one implementation, the resolution of the first decoded image may be ⅛$^{th}$ resolution of a fully decoded image (e.g., second decoded image). The first decoded image may then be processed by an application (e.g., a browsing application) to generate an intermediate image for displaying in the application (e.g., browser). In some implementations, the processing may include painting by a browsing application.

The second decoding may be initiated while the first decoded image is being processed for displaying in an application. The second decoding may be performed by a thread (e.g., a secondary thread) different from the thread (e.g., a primary thread) that is processing the first decoded image for display to speed up the overall decoding process. The second decoding may performed on the first decoded image upon retrieving the first decoded image, the DC coefficients, and the AC coefficients from the memory. The second decoding may generate a second decoded image which when processed (e.g., painted) may display an image with a resolution that may be closely equal in resolution to an image (e.g., final image) generated by standard JPEG decoding. Once the final image is available, the intermediate image being used for display is updated. This minimizes or eliminates white space and flickers and enhances user experience.

The proposed two-pass decoding mechanism outputs image pixel values faster and in a progressive manner (e.g., low resolution first followed by higher resolution) without the need to encode a JPEG image using progressive mode. This a major advantage as a vast majority (e.g., over 95%) of JPEG images generated by cameras are baseline encoded.

FIG. 1 illustrates a block diagram of an example image processing system 100 for two-pass decoding of images.

As shown in FIG. 1, the example image processing system 100 may include at least one processor 112, at least one memory 114, a controller 116, a decoder 120, and an application 170. The at least one processor 112, the at least one memory 114, the controller 116, the decoder 120, and the application 170 may be communicatively coupled via bus 118.

The at least one processor 112 may be utilized to execute instructions stored on the at least one memory 114, so as to thereby implement the various features and functions described herein, or additional or alternative features and functions. The at least one processor 112 and the at least one memory 114 may be utilized for various other purposes. For example, the at least one memory 114 may represent an example of various types of memory and related hardware and software, or a combination thereof, which may be used to implement any one of the components or modules described herein.

The at least one memory 114 may be configured to store data or information associated with the image processing system 100. For example, the at least one memory 114 may be configured to store codecs (e.g., decoder 120), images (e.g., encoded image 102, first decoded image 152, second decoded image 162, etc.) and associated data (e.g., DC coefficients 132 and AC coefficients 142 associated with first decoded image 152) for decoding images (e.g., JPEG, WebP, etc.). The at least one memory 114 may be a shared resource. For example, the image processing system 100 may be an element of a larger system (e.g., a server, a personal computer, a mobile device, and the like). Therefore, the at least one memory 114 may be configured to store data or information associated with other elements (e.g., image/video serving, web browsing, or wired/wireless communications) within the larger system.

The controller 116 may be configured to generate various control signals and communicate the control signals to various blocks in the image processing system 100. The controller 116 may be configured to generate the control signals to implement the techniques (e.g., mechanisms, procedures, etc.) described herein. The controller 116 may be configured to control the decoder 120 to decode an image, a plurality of images, and the like according to example implementations or aspects. For example, the controller 116 may generate control signals corresponding to parameters to implement a decoding mechanism (e.g., two-pass decoding).

In one example implementation, the decoder 120 may include a first-pass decoding component 122 and a second-pass decoding component 124 for decoding an image (e.g., encoded image 102). The encoded image 102 may be a baseline encoded JPEG image. A baseline encoded JPEG image may be generally defined as an image that is encoded using regular (e.g., standard) JPEG encoding. In other words, the encoded image 102 is not encoded using progressive encoding. In some implementations, an application (e.g., a browsing application, a photos application, etc.) may include software (e.g., a codec) for performing the functions of the decoder 120.

The first-pass decoding component 122 may be configured to receive the encoded image 102, perform a first decoding of the encoded image 102, and generate a first decoded image 152 along with associated DC coefficients 132 and AC coefficients 142, as described below in detail in reference to FIG. 2. The first-pass decoding component 122 may be further configured to store the first decoded image 152 and the associated DC coefficients 132 and AC coefficients in a memory (e.g., memory 114) for further decoding, if needed, by the second-pass decoding component 124. The first decoding and the second decoding may also be referred to as first-pass decoding and second-pass decoding, respectively.

The second-pass decoding component 124 may be configured to retrieve the first decoded image 152 and the associated DC coefficients 132 and AC coefficients 142 from the memory 114, and perform a second decoding, as described below in detail in reference to FIG. 2. In some implementations, the second decoding may be performed when an associated condition (e.g., related or pre-defined condition) is satisfied. In other words, the second decoding may be skipped when the associated condition is not satisfied. For example, the second-pass decoding component 124 may, prior to initiation (e.g., start) of the second decoding, determine whether the associated condition is satisfied and may skip the second decoding when the condition is not satisfied.

In one example implementation, the second-pass decoding component 124 may, prior to the initiation of the second decoding, check whether a device on which the second decoding is being performed is a mobile device and whether the device is running on a battery power with a battery power level at or equal to a threshold power level. If the second-pass decoding component 124 determines that the device is a mobile device and operating on a battery power level at or below the threshold battery power level, the second-pass decoding component 124 may skip the second decoding to save resources (e.g., power and processing (e.g., CPU, GPU, etc.) resources). In some implementations, the threshold battery power level may be defined by a user at the device. Alternatively, if the second-pass decoding component 124 determines that the device is a mobile device and operating on a battery power level above the threshold battery power level, the second-pass decoding component 124 may continue with performing of the second decoding.

In another example implementation, prior to the initiation of the second decoding, the second-pass decoding component 124 may check whether the first decoded image 152 was scaled down for display (e.g. by a browsing application). If the second-pass decoding component 124 determines that the first decoded image 152 was scaled down for display, the second decoding may not be needed (e.g., not required). In other words, when the first decoded image 152, a low-resolution image generated by the first decoding is scaled down for displaying by the application, the second decoding which generally generates a high-resolution image is not required (or useful) when a low-resolution image was scaled down. Therefore, the second decoding component 124 may skip the second decoding to save resources (e.g., power and processing (e.g., CPU, GPU, etc.) resources). Alternatively, if the second-pass decoding component 124 determines that the first decoded image was not scaled down for display, the second-pass decoding component 124 may continue with performing of the second decoding.

In a further additional example implementation, prior to the initiation of the second decoding, the second-pass decoding component 124 may check whether a user on the device has navigated away from an application or a web page referencing the first decoded image 152. In some implementations, if the second decoding component 124 determines that the user on the device has navigated away from the first decoded image 152 prior to the initiation of the second decoding, the second-pass decoding component 124 may skip the second decoding to save resources (e.g., power and processing (e.g., CPU, GPU, etc.) resources). Alternatively, if the second-pass decoding component 124 determines that the user on the device has not navigated away from the first decoded image 152 prior to the initiation of the second decoding, the second-pass decoding component 124 may continue with performing of the second decoding.

In some implementations, an application, e.g., a browser, may optimize display of a web page by not loading one or more images that are out of a display area of the browser. In such a scenario, the application may pre-load the one or more images (not loaded earlier) as the web page is being scrolled. In one example implementation, the first-pass decoding component 122 of the image processing system 100 may be used to generate low-resolution images (e.g., similar to first decoded images 152) of the one or more images to be displayed in the application prior to scrolling. This mechanism allows the application to display the low-resolution images (e.g., first decoded images) instead of large white areas when the scrolling is performed quickly. The decoding (e.g., to generate low-resolution images) of one or more images that are out of the display area of an application and generating low-resolution images for displaying in the application prior to the user scrolling may enhance user experience.

Figure 2:
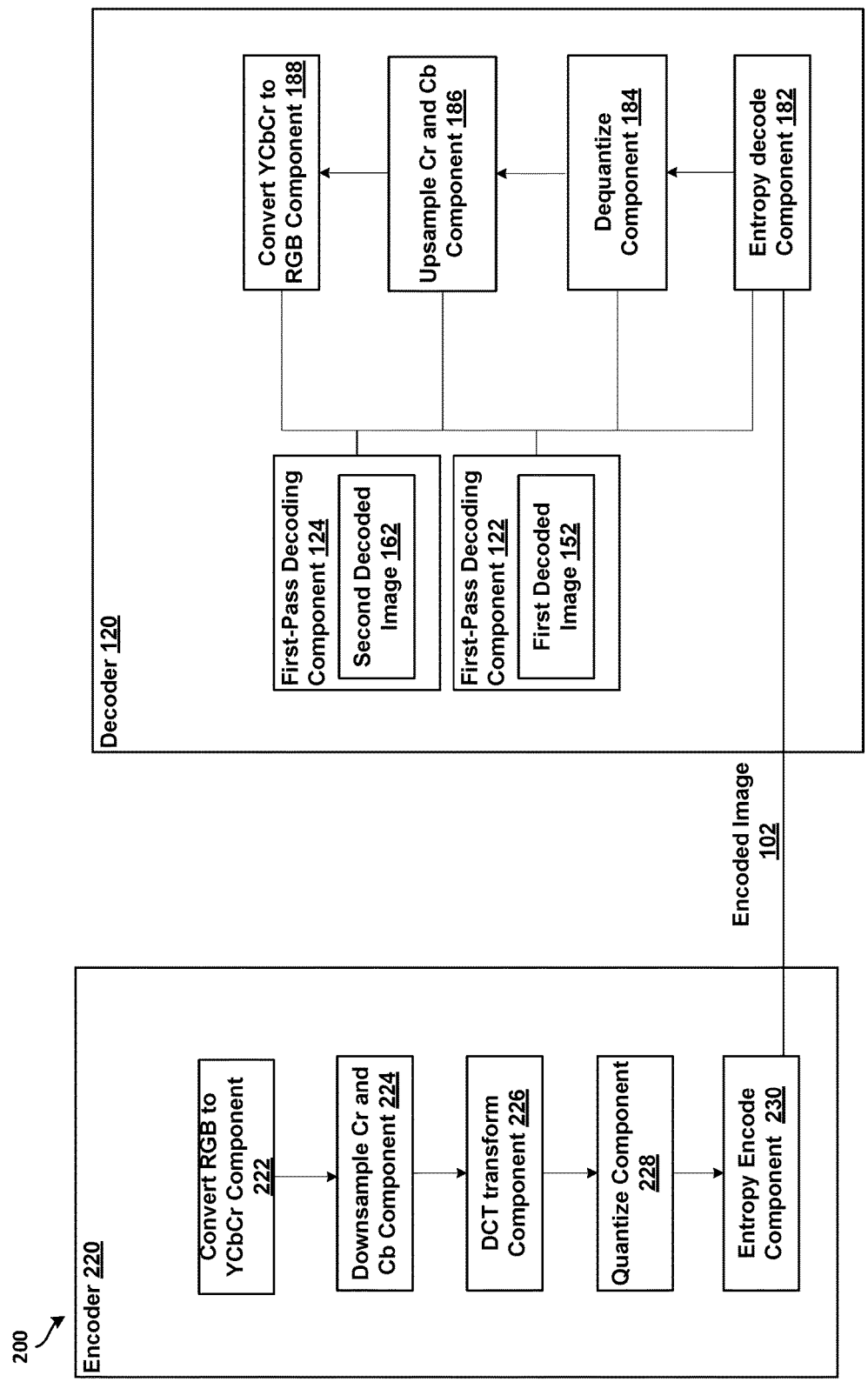
FIG. 2 illustrates a block diagram of an image processing system according to at least another example implementation.

FIG. 2 illustrates a block diagram of an image processing system 200 according to at least another example implementation.

As shown in FIG. 2, an encoder 220 may include a convert RGB to YCbCr component 222, a downsample Cr and Cb component 224, a DCT transform component 226, a quantize component 228, and an entropy encode component 230. The decoder 120 (also shown in FIG. 1) may include an entropy decode component 182, a dequantize component 184, a first-pass decoding component 122, a second-pass decoding component 124, an upsample Cr and Cb component 186, and a convert YCbCr to RGB component 188. In some implementations, the decoder 120 may receive the encoded image 102 from the encoder 220, and may perform the two-pass decoding mechanism to generate the first decoded image 152 and the second decoded image 162 (or just the first decoded image 152 in some other implementations).

In one implementation, the convert RGB to YCbCr component 222 may be configured to convert the RGB (e.g., red, green, and blue) values of pixels in a source image (not shown) to YCbCr (e.g., luminance and chrominance) values. For example, ITU-RBT.601 establishes the following formulas for converting from the RGB color space to the YCbCr color space:

$$Y = 0.299R + 0.587G + 0.114B \quad (1)$$

$$Cb = 0.564(B-Y) \quad (2)$$

$$Cr = 0.713(R-Y) \quad (3)$$

In some implementations, the color space conversion may be implemented using multipliers or look-up tables to achieve the multiplication operations, and by combining the resultant component products to complete the conversion. In an example implementation, a 3-by-3 multiplication may be used for converting between any two color spaces of three color components. To perform the RGB to YCbCr color space conversion using equations (1) to (3), convert RGB to YCbCr component 222 may be configured to perform (or instruct a processor to perform, e.g., processor 112) three multiplication operations to obtain the Y color signal, and then derive the (B−Y) and (R−Y) color difference signals before performing two more multiplication operations to obtain the Cb and Cr color signals, respectively.

The downsample Cr and Cb component 224 may be configured to separate the Y, Cr, and Cb into three image planes. For example, the Y values may be fully sampled and the Cr and the Cb values may be down sampled as, for example, a $\frac{1}{4}^{th}$ vertical and horizontal downsample of the Cr and the Cb values. The downsample Cr and Cb component 224 may then interleave the Y, Cb, and Cr image plane where each block may include Y1, Y2, Y3, Y4, Cr, and Cb values.

The discrete cosine transform (DCT) transform component 226 may be configured to convert the values of the pixels from a spatial domain to transform coefficients in a transform domain. The transform coefficients may correspond to a two-dimensional matrix of coefficients that is generally the same size as the original block. In other words, there may be as many transform coefficients as pixels in the original block. However, due to the transformation, a portion of the transform coefficients may have values equal to zero. The DCT transform component 226 may be configured to transform the pixel values of a block into transform coefficients in, for example, the frequency domain. The transform coefficients may include Karhunen-Loève Transform (KLT), Discrete Cosine Transform (DCT), or Singular Value Decomposition Transform ("SVD").

The quantize component 228 may be configured to reduce data in each transformation coefficient. Quantization may involve mapping values within a relatively large range to values in a relatively small range, thus reducing the amount of data needed to represent the quantized transform coefficients. The quantize component 228 may convert the transform coefficients into discrete quantum values, which may be referred to as quantized transform coefficients or quantization levels. For example, the quantize component 228 may be configured to add zeros to the data associated with a transformation coefficient. For example, an encoding standard may define 128 quantization levels in a scalar quantization process.

The entropy encode component 230 may be configured to perform entropy encoding (e.g., Huffman encoding, arithmetic encoding, etc.) to the blocks. After encoding all the blocks that correspond to the source image (not shown), the encoder 220 may generate an encoded image (e.g., encoded image 102), also referred to as encoded bitstream), and generate an encoded imaged 102.

The entropy decode component 182 may be configured to perform entropy decoding (e.g., Huffman decoding) of the encoded blocks (or bitstream). In performing the entropy decoding, the entropy decode component 182 may determine the blocks in the order (e.g., location) in which they were encoded. However, the entropy decode component 182 may not be able to determine the location of a block before the entropy decode component 182 entropy decodes at least one preceding block because the encoded blocks do not have a fixed size and there are no markers demarcating block boundaries. Therefore, for a block to be decoded, the preceding blocks (e.g., in the bitstream or the encoded image 102) should be entropy decoded in order to determine the location of the requested block. The dequantize component 184 may be configured to dequantize the quantized transform coefficients. For example, in some implementations, one DC coefficient and 63 AC coefficients may be generated for each block (e.g., a minimum coded unit (MCU)). In some implementations, the DC and AC coefficients (132, 142) may be stored (e.g., temporarily) in a memory (e.g., memory 114) for retrieval by the second-pass decoder 124, when the second-pass decoder 124 performs the second decoding.

In some implementations, once dequantize component 184 generates the DC coefficients 132 and the AC coefficients 142, the first-pass decoding component 122 may perform first decoding and generate a first decoded image 152 using the DC coefficients 132 (for example, only the DC coefficients 132). In some other implementations, the second-pass decoding component 124 may be configured to perform IDCT operations (e.g., using the DC coefficients 132 and the AC coefficients 142) on the first decoded image 152 to generate the second decoded image 162. Alternatively, the second-pass decoding component 124 may, in response to determining that an associated condition is not satisfied prior to initiation of the second decoding, may skip the second decoding to conserve resources. If the second-pass decoding component 124 determines that the condition is satisfied, the second-pass decoding component 124 may perform IDCT operations to inverse transform (e.g., using asymmetric discrete sine transform (ADST)) the dequantized transform coefficients to produce a derivative residual that may be identical to that created by the downsample Cr and Cb component 224 during the encoding process. The upsample Cr and Cb component 186 and the convert YCbCr to RGB component 188 upsample the Cr and the Cb values and convert the YCbCr values to RGB using inverse algorithms (as compared to the convert RGB to YCbCr component 222 and the downsample Cr and Cb component 224) to generate RGB values for display, for the first decoded image 152 during the first decoding and the second decoded image 162 during the second decoding.

The decoding mechanism described above allows for the first-pass decoding component 122 to quickly (e.g., compared to the standard JPEG decoding) generate the first decoded image 152 (e.g., a low-resolution image) which may be used for initial display in an application. The second-pass decoding component 124 may generate the second decoded image 162 (e.g., the second decoded image 162 is of higher resolution than the first decoded image 152) which may be used to update the first decoded image 152.

In some implementations, for example, once the second decoded image 162 is processed by an application for displaying, the intermediate image (e.g., the image generated for displaying by processing the first decoded image 152) which may be used for displaying by the browser application may be updated with the final processed image (e.g., final image). The final image is a full resolution image, closely equal in resolution to an image generated by standard JPEG decoding (or decoding and processing). In some implementations, the updating may include changing the application's reference to a decoded image in the memory (e.g., from the first decoded image 152 stored in the memory 114 to the second decoded image 162 stored in the memory 114, or from the intermediate image to the final image) and triggering the application to repaint (e.g., may be performed by a direct function call or by posting an asynchronous message to the application indicating that the area covered by the image requires repainting and allowing the application to update as needed). In the proposed mechanism, the entropy decoding is only performed once, for example, by entropy decode component 182 upon receiving the encoded image 102 from the encoder 220.

In some implementations, for example, the main thread of an application (e.g., browser), in parallel, may further process the first decoded image 152 and perform other operations needed for displaying by the browser application (e.g., memory copy, scaling, painting, etc.) to generate the intermediate image described above (e.g., from the first decoded image 152). The intermediate image being displayed by the application may be of low-resolution when compared to the resolution of an image decoded by a standard JPEG decoding process. However, the intermediate image, although of lower resolution, may be generated in much shorter time and thereby allowing the browser to quickly display the image and avoid flickers or white spaces. This enhances the user experience. Furthermore, the generation of the intermediate image (or the final image) may be performed by another processor, e.g., a graphics processing unit (GPU), of the image processing system 110, to alleviate any burden on a central processing unit (CPU) of a device, e.g., processor 112. In addition, the two-pass decoding mechanism described above allows for an application (e.g., a browser) to display images that are encoded using standard JPEG encoding and does not need the progressive encoding of the images which requires the encoded images to be encoded using progressive encoding mechanism (e.g., encoded multiple times).

Figure 3:
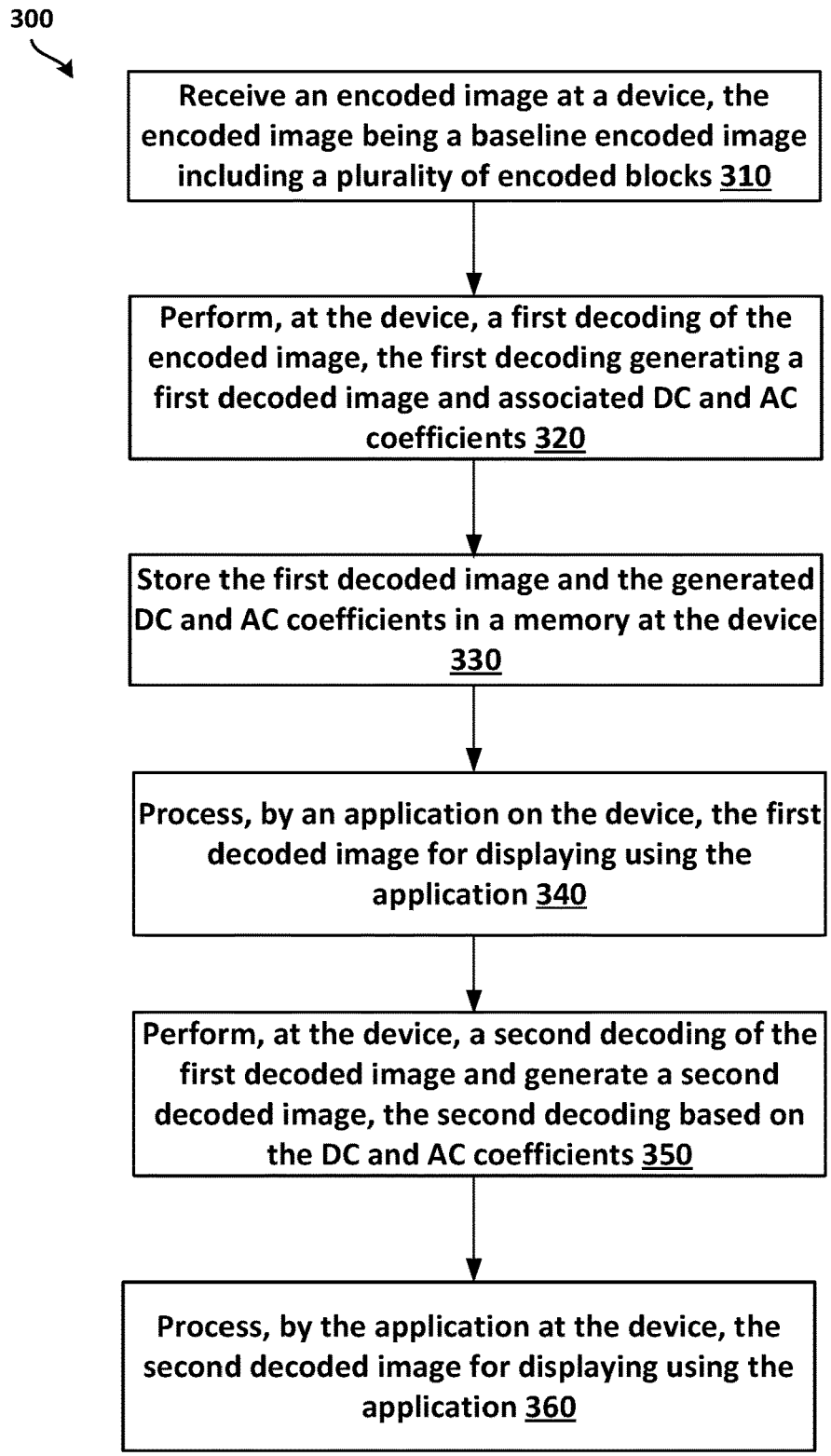
FIG. 3 illustrates a flowchart of a method for performing a two-pass decoding of an image, according to at least one example implementation.

FIG. 3 illustrates a flowchart 300 of a method of performing a two-pass decoding of an image according to least one example implementation.

At block 310, the decoder 120 receives an encoded image at a device, the encoded image being a baseline encoded image including a plurality of encoded blocks. For example, in one implementation, the decoder 120 or the first-pass decoding component 122 may receive the encoded image 102. In some implementations, the encoded image 102 may include a plurality of encoded blocks (or encoded bit stream). In some other implementations, the device may be the image processing system 100.

At block 320, the decoder performs, at the device, a first decoding of the encoded image, the first decoding generating a first decoded image and associated direct current (DC) and alternating current (AC) coefficients, the DC and AC coefficients generated for each encoded block of the plurality of encoded blocks, and the first decoded image decoded based on the DC coefficients. For example, in one implementation, the decoder 120 or the first-pass decoding component 122 may perform a first decoding of the encoded image 102 and generates the first decoded image 122, the DC coefficients 132, and the AC coefficients 142. The first-pass decoding component 122 generates the DC coefficients 132 (e.g., one DC coefficient for each encoded block or MCU) and the AC coefficients 142 (e.g., 63 AC coefficients per each encoded block or MCU), and generates the decoded image 132 based on the DC coefficients 132.

The generating of the first-decoded image 152 using the DC coefficients (e.g., one DC coefficient per each MCU) generates a decoded image (e.g., first decoded image 152) that is of low-resolution when compared to a decoded image which is decoded using both the DC and AC coefficients. In some implementations, the resolution of the first decoded image 152 (for example, decoded using only the DC coefficients) may generate a decoded image (e.g., first decoded image 152) with a resolution that is $\frac{1}{8}^{th}$ the resolution of an image generated using both the DC and the AC coefficients.

At block 330, the decoder 120 stores the first decoded image and the associated DC and AC coefficients in a memory at the device. For example, in one implementation, the decoder 120 or the first-pass decoding component 122 may store the first decoded image (e.g., first decoded image 152) in a memory at the device (e.g., memory 114), for example, for later retrieval by the second-pass decoding component 124, e.g., if needed.

At block 340, the application 170 performs processing of the first decoded image for displaying using the application. For example, in one implementation, the application 170 may process the first-decoded image 152 for displaying using the application. In some implementations, the application may be a web browsing application (e.g., browser). The processing may, in some implementations, may include displaying of the low resolution image (e.g., first decoded image 152) to minimize or eliminate flickers or white spaces, and thereby improving user experience. In some other implementations, the processing may include a memory copy (e.g., copy the first decoded image 152 from the memory 114 for displaying) or may also include performing a scaling operation (e.g., an upscaling operation) to enlarge the low-resolution image (e.g., the first decoded image 152 which is of $\frac{1}{8}^{th}$ resolution). The upscaling may be performed using, for example, a bicubic scaling or a bilinear scaling to generate the low-resolution image faster (e.g. for generating the first decoded image 152).

At block 350, the decoder performs at the device, a second decoding of the first decoded image and generating a second decoded image, the second decoding based on the DC and AC coefficients that are stored in the memory, the second decoding being performed when a condition is satisfied, and while the processing of at least a portion of the first decoded image is in progress. For example, in one implementation, the second-pass decoding component 124 may perform a second decoding of the first decoded image (e.g., first decoded image 152) and may generate the second decoded image 162. The second decoded image 162 may be generated by further decoding of the first decoded image 152 using both the DC coefficients 132 and the AC coefficients 142, all of which may be retrieved from the memory 114. In one example implementation, the second-pass decoding component 124 may be off-loaded to be performed by a secondary thread of the application while the primary thread of the application is processing the first decoded image 152 for displaying.

In some implementations, the second-pass decoding component 124 may perform the second decoding if the second-pass decoding component 124 determines that one or more conditions are satisfied. Otherwise, the second-pass decoding component 124 may skip the second decoding. In one example implementation, the second-pass decoding component 124 may skip the second decoding if the device on which the second decoding and the displaying are being performed is a mobile device with a battery power level that is equal to or below a threshold power level. In another example implementation, the second-pass decoding component 124 may perform the second decoding when the first decoded image 122 is not scaled for displaying at the device. Otherwise, the second-pass decoding component 124 may skip the second decoding. In one more example implementation, the second-pass decoding component 124 may skip the second decoding when the first decoded image is scaled down for displaying at the device.

At block 360, the application 170 performs processing of the second decoded image for displaying using the application. For example, in one implementation, the application 170 may process the second-decoded image 162 for displaying using the application. In some implementations, the application may be the web browsing application (e.g., browser). The processing may, in some implementations, include displaying of the high resolution image (e.g., second decoded image 152) to enhance user experience.

In some implementations, for example, a browser may initially display the low-resolution image (e.g., first decoded image 152) and update the low-resolution image with the high-resolution image (e.g., second decoded image 162). This approach minimizes or eliminates any problems associated with flickers (e.g., when being painted) or white spaces. The two-pass decoding mechanism may provide the benefits of a progressive encoding/decoding mechanism even when the input image has been encoded normally (e.g., baseline JPEG image). In other words, the two-pass mechanism may achieve results similar to progressive encoding/decoding using a baseline JPEG image.

Figure 4:
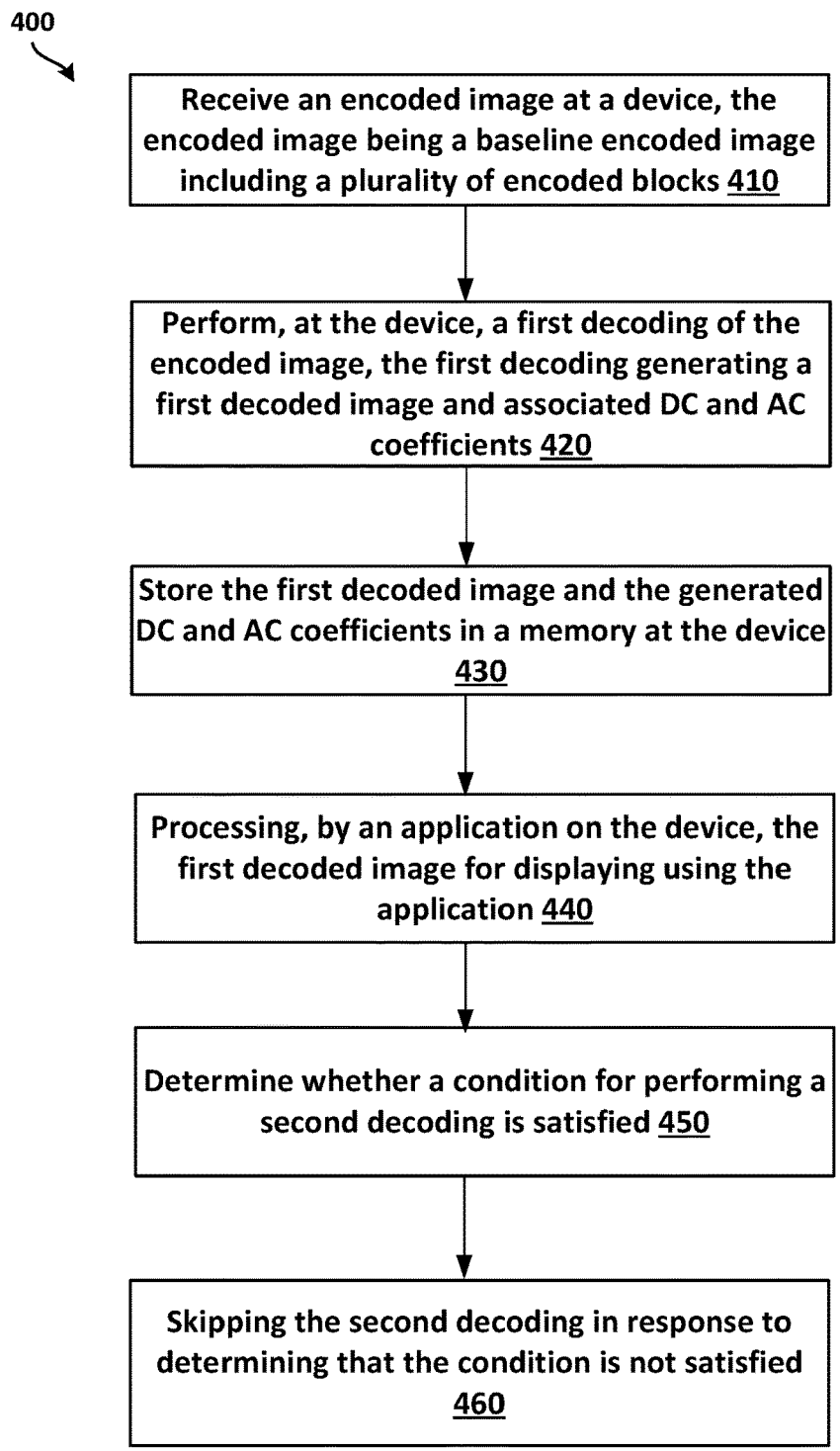
FIG. 4 illustrates a flowchart of a method for performing a decoding of an image while saving resources, according to at least one example implementation.

FIG. 4 illustrates a flowchart 400 of a method of performing a decoding of an image while saving resources according to least one example implementation. The operations performed at blocks 410, 420, 430, and 440 may be similar to operations performed at blocks 310, 320, 330, and 340 respectively.

At block 450, the decoder may determine whether a condition for performing a second decoding is satisfied. For example, in one implementation, the second-pass decoding component 124 may determine whether a condition is satisfied. If the second-pass decoding component 124 determines that the condition is satisfied, the second-pass decoding component 124 performs second decoding.

Alternatively, at block 460, the second-pass decoding component may skip the second decoding in response to determining that the condition is not satisfied. For example, if the second-pass decoding 124 component determines that the condition is not satisfied, the second-pass decoding component 124 may skip the second decoding to conserve resources (e.g., power, processor resources, etc.).

This mechanism provides the ability to perform a second decoding to reap the benefits of two-pass decoding to generate a high-resolution image while at the same time providing the flexibility to skip the second decoding of the two-pass decoding when it is not necessary to conserve resources.

Figure 5:
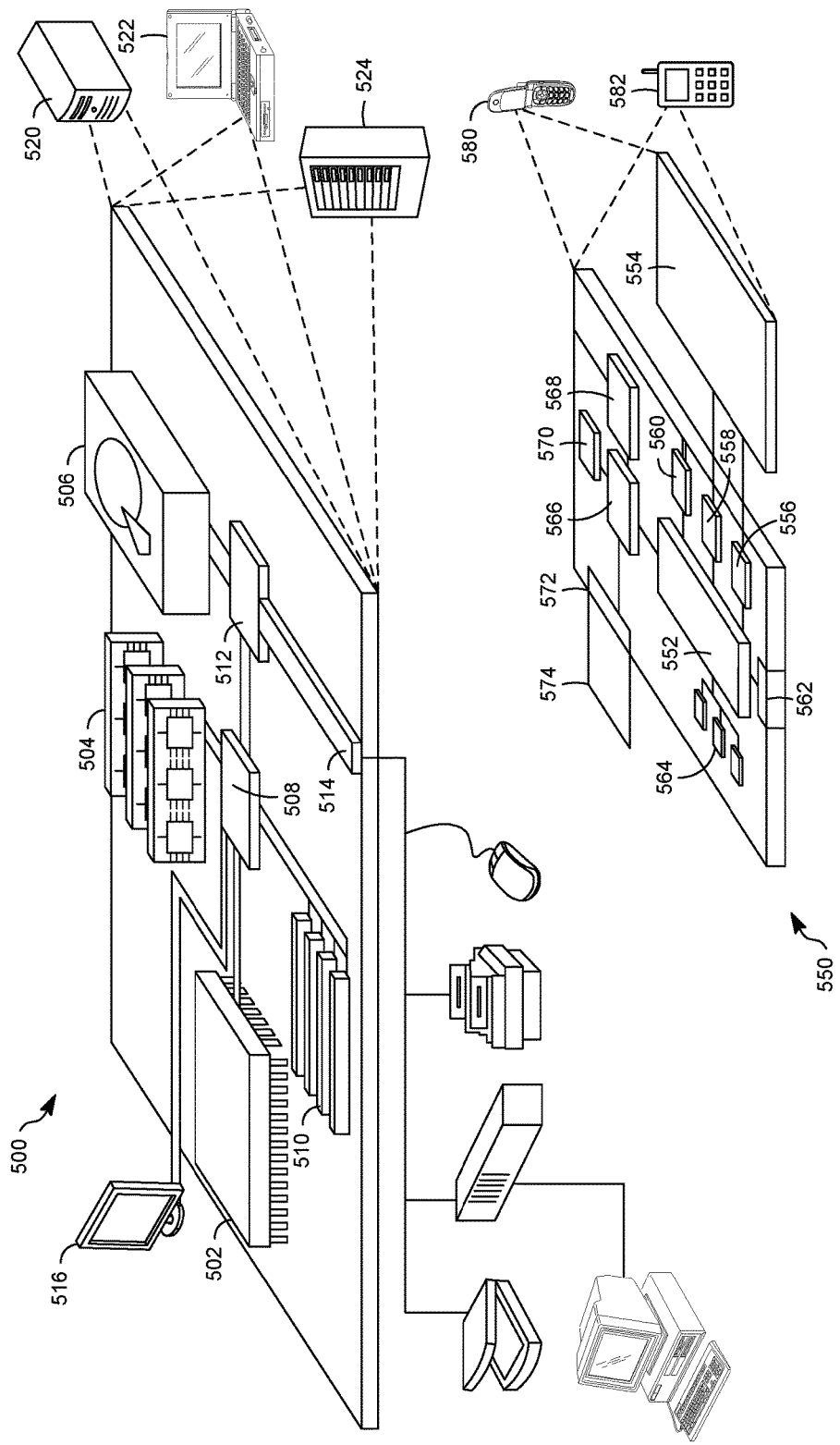
FIG. 5 shows an example of a computer device and a mobile computer device according to at least one example implementation.

FIG. 5 shows an example of a computer device 500 and a mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. A method, comprising:
receiving an encoded image at a device, the encoded image being a baseline encoded image including a plurality of encoded blocks;
performing, at the device, a first decoding of the encoded image, the first decoding generating a first decoded image and associated direct current (DC) and alternating current (AC) coefficients, the DC and AC coefficients generated for each encoded block of the plurality of encoded blocks, and the first decoded image decoded based on the DC coefficients;
storing the first decoded image and the associated DC and AC coefficients in a memory at the device;
processing, by an application on the device, the first decoded image for displaying using the application;
performing, at the device, a second decoding of the first decoded image and generating a second decoded image, the second decoding based on the DC and AC coefficients that are stored in the memory, the second decoding being performed when a condition is satisfied, and while the processing of at least a portion of the first decoded image is in progress; and
processing, by the application at the device, the second decoded image for displaying using the application.

2. The method of claim 1, wherein the first decoded image is a low-resolution image and the second decoded image is a high-resolution image.

3. The method of claim 1, wherein the first decoded image is a low-resolution image and the second decoded image is a high-resolution image, and wherein the low-resolution image is one eighth resolution of the high-resolution image.

4. The method of claim 1, wherein the generating of the first decoded image includes performing color conversion from YCbCr to RGB by a graphics processing unit (GPU) of the device and the generating of the second decoded image includes performing the color conversion from YCbCr to RGB by the GPU of the device.

5. The method of claim 1, wherein the application is a web browser application.

6. The method of claim 1, wherein the processing of the first and second decoded images are performed by an application on the device, and wherein the first and second decoding are performed by a first thread and a second thread, respectively, both threads being associated with the application.

7. The method of claim 1,
wherein the condition includes:
identifying whether the device is a mobile device; and
determining, in response to identifying that the device is a mobile device, whether the device is operating at a battery power level above a threshold power level, and
skipping the second decoding in response to the determining that the mobile device is not operating at a battery power level above the threshold power level.

8. The method of claim 1, wherein the condition includes determining whether the first decoded image is not scaled down for displaying at a device, and
skipping the second decoding in response to determining that the first decoded image is scaled down for displaying at the device.

9. The method of claim 1, wherein the condition includes determining whether a user of the device has not navigated away from the first decoded image prior to initiation of the second decoding, and
skipping the second decoding in response to the determining that the user navigated away from the first decoded image prior to the initiation of the second decoding.

10. The method of claim 1, wherein the application is a browsing application, and the first decoded image is generated and processed for displaying using the application when a location of the first image is out of a display area of the browsing application.

11. An image decoder, comprising:
a processor; and
a memory, the memory including instructions configured to cause the processor to:
receive an encoded image, the encoded image being a baseline encoded image including a plurality of encoded blocks;
perform a first decoding of the encoded image, the first decoding generating a first decoded image and associated direct current (DC) and alternating current (AC) coefficients, the DC and AC coefficients generated for each encoded block of the plurality of encoded blocks, and the first decoded image decoded based on the DC coefficients;
store the first decoded image and the associated DC and AC coefficients in a memory;
process, by an application, the first decoded image for displaying using the application;
perform a second decoding of the first decoded image and generating a second decoded image, the second decoding based on the DC and AC coefficients that are stored in the memory, the second decoding being performed when a condition is satisfied, and while the processing of at least a portion of the first decoded image is in progress; and
process by the application the second decoded image for displaying by the application.

12. The decoder of claim 11, wherein the first decoded image is a low-resolution image and the second decoded image is a high-resolution image.

13. The decoder of claim 11, wherein the first decoded image is a low-resolution image and the second decoded image is a high-resolution image, and wherein the low-resolution image is one eighth resolution of the high-resolution image.

14. The decoder of claim 11, wherein the processor is configured to generate the first decoded image that includes performing color conversion from YCbCr to RGB by a graphics processing unit (GPU) of the device and generating of the second decoded image includes performing the color conversion from YCbCr to RGB by the GPU of the device.

15. The decoder of claim 11, wherein the processor is configured to process the first and second decoded images by an application on the device, and wherein the first and second decoding are performed by a first thread and a second thread, respectively, both threads associated with the application.

16. The decoder of claim 11,
wherein the condition includes:
identifying whether the device is a mobile device; and
determining, in response to identifying that the device is a mobile device, whether the device is operating at a battery power level above a threshold power level, and the processor is further configured to:
skip the second decoding in response to the determining that the mobile device is not operating at a battery power level above the threshold power level.

17. The decoder of claim 11, wherein the condition includes determining whether the first decoded image is not scaled down for displaying at a device, and the processor is further configured to:
skip the second decoding in response to determining that the first image is scaled down for displaying at the device.

18. The decoder of claim 11, wherein the condition includes determining whether a user of the device has not navigated away from the first decoded image prior to initiation of the second decoding, and the processor is further configured to:
skip the second decoding in response to the determining that the user navigated away from the first decoded image prior to the initiation of the second decoding.

19. The decoder of claim 11, wherein the application is a browsing application, and the first decoded image is generated and processed for displaying in the application when a location of the first image is out of a display area of the browsing application.

20. A non-transitory computer-readable storage medium having stored thereon computer executable program code which, when executed on a computer system, causes the computer system to perform a method, comprising:

receiving an encoded image at a device, the encoded image being a baseline encoded image including a plurality of encoded blocks;

performing, at the device, a first decoding of the encoded image, the first decoding generating a first decoded image and associated direct current (DC) and alternating current (AC) coefficients, the DC and AC coefficients generated for each encoded block of the plurality of encoded blocks, and the first decoded image decoded based on the DC coefficients;

storing the first decoded image and the associated DC and AC coefficients in a memory at the device;

processing, by an application on the device, the first decoded image for displaying using the application;

performing, at the device, a second decoding of the first decoded image and generating a second decoded image, the second decoding based on the DC and AC coefficients that are stored in the memory, the second decoding being performed when a condition is satisfied, and while the processing of at least a portion of the first decoded image is in progress; and processing, by the application at the device, the second decoded image for displaying by the application.

* * * * *